(12) United States Patent
Hayakawa

(10) Patent No.: US 7,002,633 B2
(45) Date of Patent: Feb. 21, 2006

(54) SYNCHRONOUS PROCESSING SYSTEM AT TIME OF CONVERTING SPECIFICATION OF MOVING PICTURE INFORMATION

(75) Inventor: Yuuichi Hayakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 473 days.

(21) Appl. No.: 10/197,513

(22) Filed: Jul. 18, 2002

(65) Prior Publication Data

US 2003/0016303 A1 Jan. 23, 2003

(30) Foreign Application Priority Data

Jul. 19, 2001 (JP) .............................. 2001-220436

(51) Int. Cl.
*H04N 5/073* (2006.01)
*H04N 7/52* (2006.01)
*H04N 7/54* (2006.01)

(52) U.S. Cl. .................. 348/423.1; 348/512; 348/515; 348/516; 348/425.4; 375/240.28; 370/509

(58) Field of Classification Search ................ 348/512, 348/515, 516, 552, 522, 500, 484, 495, 423.1, 348/425.1, 425.4; 375/240.01, 240.26, 240.28, 375/356; 386/98, 99, 119; 725/136, 131, 725/139, 151, 112, 113; 715/500.1; 709/231, 709/232; 370/324, 509, 503, 512, 513, 514
See application file for complete search history.

(56) References Cited

U.S. PATENT DOCUMENTS

| | | | | |
|---|---|---|---|---|
| 5,699,107 A | * | 12/1997 | Lawler et al. ................ | 725/58 |
| 6,324,694 B1 | * | 11/2001 | Watts et al. .................. | 725/32 |
| 6,378,130 B1 | * | 4/2002 | Adams ......................... | 725/95 |
| 6,449,653 B1 | * | 9/2002 | Klemets et al. ............. | 709/231 |
| 6,615,252 B1 | | 9/2003 | Oka et al. | |
| 6,654,956 B1 | * | 11/2003 | Trinh et al. ................. | 725/100 |
| 6,701,524 B1 | * | 3/2004 | Okamura et al. ............ | 725/37 |
| 6,792,047 B1 | * | 9/2004 | Bixby et al. ........... | 375/240.26 |
| 2003/0149988 A1 | * | 8/2003 | Ellis et al. | |

FOREIGN PATENT DOCUMENTS

| | | |
|---|---|---|
| AU | 200017852 B2 | 7/2000 |
| JP | 7-87324 | 3/1995 |
| JP | 10-257440 A | 9/1998 |
| JP | 2001-78166 A | 9/2001 |
| JP | 2002-540645 A | 11/2002 |
| WO | 00/40020 | 7/2000 |

OTHER PUBLICATIONS

WPI Abstract Accession No. 1996-154095 (Feb. 2, 1996) & JP 08032621, 4 pages.

* cited by examiner

*Primary Examiner*—John Miller
*Assistant Examiner*—Jean W. Désir
(74) *Attorney, Agent, or Firm*—Foley & Lardner LLP

(57) ABSTRACT

A main control device, to which instructions for image recording from a dynamic-image terminal are transmitted, gives instructions for accumulation processing of dynamic-image information to a dynamic-image information processing device to transmit instructions for regeneration processing of dynamic-image information to the device dynamic image information processing by instructions for regeneration from a dynamic-image terminal, and to transmit to an accumulation control device instructions for transmitting regenerated dynamic-image information. The dynamic-image information processing device affixes synchronous information to accumulated dynamic-image information transmitted from the dynamic-image terminal by instructions for transmitting accumulated dynamic-image information to transmit it to the accumulation control device.

5 Claims, 6 Drawing Sheets

1 MAINTENANCE DEVICE
2 MAIN CONTROL DEVICE
3 MOVING PICTURE INFORMATION PROCESSING DEVICE
3-1 TRANSMISSION/RECEPTION SECTION
3-2 NON-VOLATILE MEMORY
3-3 SEPARATION SECTION
3-4 SYNCHRONIZING CONTROL SECTION
3-5 CONVERSION SECTION
3-6 AUDIO CONVERSION SECTION
3-7 IMAGE CONVERSION SECTION
3-8 MULTIPLEX SECTION
4 MOVING PICTURE TERMINAL
5 EXCHANGE DEVICE
6 ACCUMULATION CONTROL DEVICE
7 ACCUMULATION DEVICE
8 MOVING PICTURE TERMINAL
9 EXCHANGE DEVICE
10 NETWORK

FIG. 1

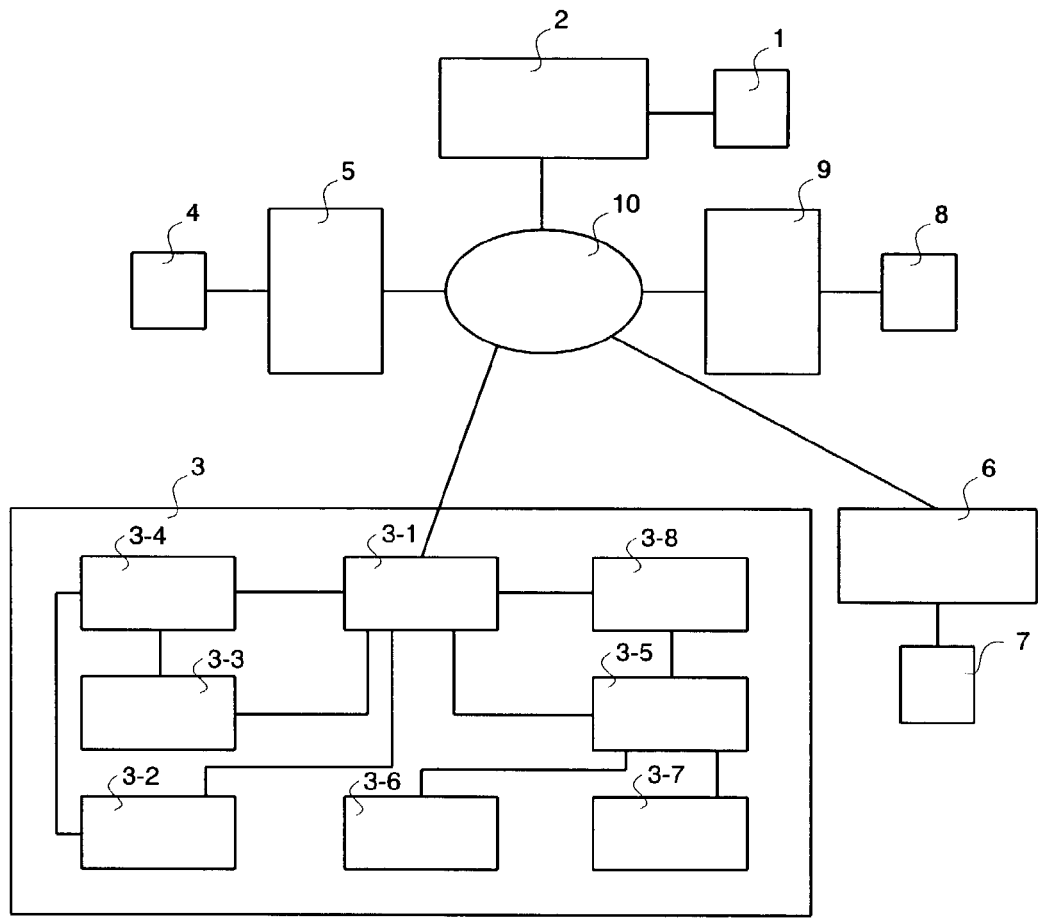

| 1 | MAINTENANCE DEVICE | 4 | MOVING PICTURE TERMINAL |
| 2 | MAIN CONTROL DEVICE | 5 | EXCHANGE DEVICE |
| 3 | MOVING PICTURE INFORMATION PROCESSING DEVICE | 6 | ACCUMULATION CONTROL DEVICE |
| 3-1 | TRANSMISSION/RECEPTION SECTION | 7 | ACCUMULATION DEVICE |
| 3-2 | NON-VOLATILE MEMORY | 8 | MOVING PICTURE TERMINAL |
| 3-3 | SEPARATION SECTION | 9 | EXCHANGE DEVICE |
| 3-4 | SYNCHRONIZING CONTROL SECTION | 10 | NETWORK |
| 3-5 | CONVERSION SECTION | | |
| 3-6 | AUDIO CONVERSION SECTION | | |
| 3-7 | IMAGE CONVERSION SECTION | | |
| 3-8 | MULTIPLEX SECTION | | |

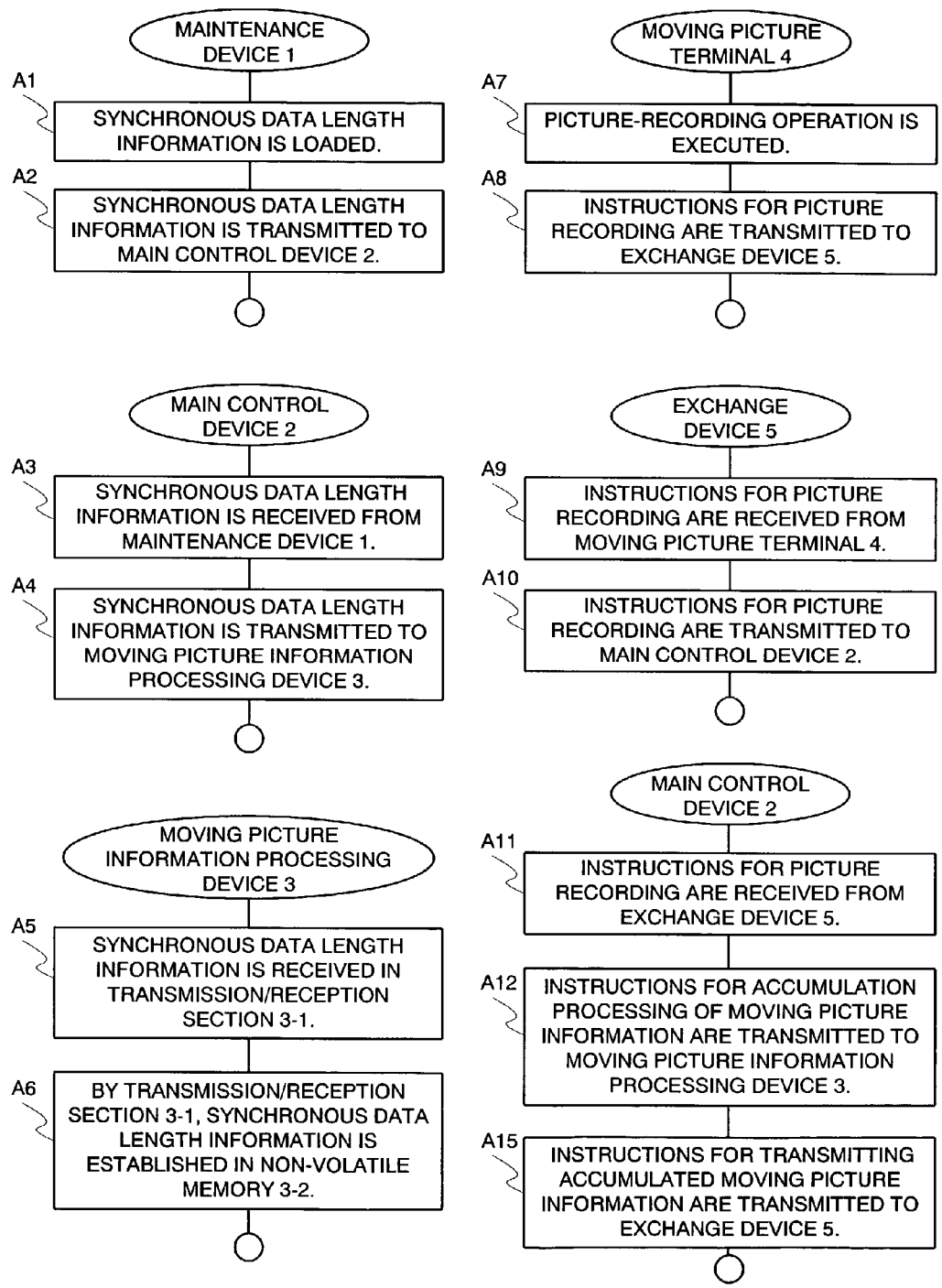

SYNCHRONOUS PROCESSING SYSTEM AT TIME OF CONVERTING SPECIFICATION OF MOVING PICTURE INFORMATION

BACKGROUND OF THE INVENTION

The present invention relates to a synchronous processing system at the time of converting specification of moving picture information, and more particular to a synchronous processing system at the time of converting specification of moving picture information, which enables conversion of specification of audio/picture information without injuring synchronism of audio/picture information as moving picture information, in a system where: moving picture (audio/picture) information, which was input, is accumulated by instructions for picture recording from fixed-network (mobile-network) moving picture terminals; the accumulated moving picture information is fetched by instructions for regeneration from the other fixed-network (mobile-network) moving picture terminals that corresponded to moving picture information having different specification of audio/picture information; and the audio/picture information is converted into one having specification for a regenerated moving picture terminal to output it as moving picture information that can be regenerated.

In developing a system that complied with the picture recording and the regeneration between the moving picture terminals, which corresponded to the moving picture information having different specification of the audio/picture information, in order that the moving picture information, which was able to be regenerated, had to be transmitted to the moving picture terminal for regeneration, it was necessary that the moving picture information, for which the picture recording was made, was separated into the audio information and the picture information, and that, after respective kinds of information were converted into one having the specification for the moving picture terminal for regeneration, they were multiplexed again.

In realizing the above-mentioned operation, the respective data lengths of the audio information and the picture information separated from the moving picture information for which the picture recording was made are different, and the data lengths before and after converting the specification are also different, whereby the problem occurred that the synchronism of the audio/picture information as the moving picture information was injured in multiplexing again So as to settle the above-mentioned problems, conventionally, the synchronous processing system of the moving picture/audio disclosed, for example, in JP-A- 87324/1995 has been offered.

The art described in the above-mentioned publication is characterized in: providing picture input/output means, picture data memory means for memorizing picture data that was input, picture compression/expansion means for compressing or expanding the picture data, compressed data memory means for memorizing the compressed picture data, audio data input/output means for inputting/outputting audio data that corresponds to the picture data, format converter for converting this input audio data into a format adapted to a compressing process in the above-mentioned picture compression/expansion means, and audio data memory means for memorizing this format-converted audio data; and being configured so that the picture data memorized in the above-mentioned picture data memory means is compressed, and together with it, the audio data after the format conversion memorized in the above-mentioned audio data memory means is handled as the picture data and is compressed to synchronize the picture with the audio.

In the prior art described in the above-mentioned publication, by performing the process by frame unit in such a manner that one frame of the audio data is converted into a format for picture compression processing, and that the converted audio data is compressed as the picture data, the audio synchronized with the picture can be recorded, and accordingly, in regenerating, by performing the process opposite to the time of recording for the picture data and the audio data, the merit exists that the audio is regenerated, being synchronized with the picture; however plenty of the format converting processes for the audio data and the picture data were required, and the defect existed that the configuration and the operation were complicated.

SUMMARY OF THE INVENTION

The present invention has been accomplished in consideration of the conventional circumstances mentioned above, and accordingly, an object thereof is to provide a new synchronous processing system at the time of converting the specification of the moving picture information that enables the solution of the above-mentioned problems inherent in the prior art.

So as to accomplishes the above-mentioned object, the synchronous processing system at the time of converting specification of moving picture information relating to the present invention is configured to comprise: a main control device, to which instructions for picture recording from a first moving picture terminal are transmitted, for giving instructions for accumulation processing of moving picture information to a moving picture information processing device to be described later, thereafter to transmit to said first moving picture terminal instructions for transmitting accumulated moving picture information, and together with it, to which instructions for regeneration from a second moving picture terminal are transmitted, for transmitting to a moving picture information processing device to be described later instructions for regeneration processing of moving picture information, thereafter to transmit to an accumulation control device to be described later instructions for transmitting regenerated moving picture information; the moving picture information processing device for receiving accumulated moving picture information transmitted from said first moving picture terminal by said instructions for transmitting accumulated moving picture information to separate it into audio information and picture information, to affix synchronous information hereto, and to transmit it to an accumulation control device to be described later, and together with it, for receiving audio/picture information to be received by said instructions for regeneration processing of moving picture information to which synchronous information was affixed to convert specification of said audio information/picture information according to said affixed synchronous information, to multiplex the audio/picture information after converting the specification as regenerated moving picture information, and to transmit it to said second moving picture terminal; and the accumulation control device for accumulating said audio/picture information transmitted by the above moving picture information processing device, to which said synchronous information was affixed, in an accumulation device, and together with it, for obtaining the audio/picture information, to which said synchronous signal was affixed, from said accumulation device by said instructions for transmitting regenerated moving picture information, which was transmitted by said main control device, to transmit it to said moving picture information processing device.

Said moving picture information processing device including: transmission/reception means for administering transmission/reception of signals of said instructions for accumulation processing of moving picture information, said accumulated moving picture information, said audio/picture signal to which the synchronous signal was affixed, said instructions for regeneration processing of moving picture information, said regenerated moving picture information, etc.; moving picture information separation means for separating said accumulated moving picture information into audio information and picture information; synchronizing control means for affixing synchronous information to the above separated audio information and picture information; converter for posting said audio information and picture information to audio converter and picture converter to be described later respectively according to said affixed synchronous information, and together with it, to which the audio information and the picture information of which the specification was converted by the above audio converter and picture converter respectively are posted, for outputting the audio/picture information after converting the specification; and multiplex means for multiplexing the above audio/picture information after converting the specification as regenerated moving picture information to transmit it to said second moving picture terminal through said transmission/reception means.

Said moving picture information processing device also has a non-volatile memory for storing synchronous data length information that serves as a basis for said synchronous information.

Said synchronous data length information to be stored in said non-volatile memory is output from a maintenance device connected to said main control device, and is transmitted to said moving picture information processing device via said main control device.

In FIG. 1, instructions for picture recording from a moving picture terminal 4 are transmitted to a main control device 2 via an exchange device 5, in the main control device 2, instructions for accumulation processing of moving picture information are transmitted to a moving picture information processing device 3, and within the moving picture information processing device 3, the instructions are received in a transmission/reception section 3-1, which comes to be in a wait state for accumulated moving picture information.

Thereafter, in the main control device 2, instructions for transmitting accumulated moving picture information are transmitted to the moving picture terminal 4 via the exchange device 5, and in the moving picture terminal 4, the accumulated moving picture information is transmitted to the moving picture information processing device 3 via the exchange device 5.

Within the moving picture information processing device 3, the accumulated moving picture information is received in the transmission/reception section 3-1 to post it to a separation section 3-3, the accumulated moving picture information, which was received, is separated into audio information and picture information in the separation section 3-3 to post it to a synchronizing control section 3-4, synchronous information is affixed to the separated audio information and picture information in the synchronizing control section 3-4 to post it to the transmission/reception section 3-1, and in the transmission/reception section 3-1, the audio/picture information to which the synchronous information was affixed is transmitted to an accumulation control device 6. The accumulation control device 6 accumulated the received information in an accumulation device 7.

In FIG. 1, instructions for regeneration from a moving picture terminal 8 are transmitted to the main control device 2 via an exchange device 9, the main control device 2 transmits instructions for regeneration processing of moving picture information to the moving picture information processing device 3, and within the moving picture information processing device 3, the instructions are received in the transmission/reception section 3-1, which comes to be in a wait state for regenerated moving picture information.

Thereafter, the main control device 2 transmits to the accumulation control device 6 instructions for transmitting regenerated moving picture information, and the accumulation control device 6 obtains the audio/picture information to which the synchronous information was affixed from the accumulation device 7, and transmits it to the moving picture information processing device 3.

Within the moving picture information processing device 3, the audio/picture information to which the synchronous information was affixed is received in the transmission/reception section 3-1 to post it to a conversion section 3-5, the conversion section 3-5 posts the audio information and the picture information to a audio conversion section 3-6 and an picture conversion section 3-7 respectively according to the affixed synchronous information, the audio conversion section 3-6 and the picture conversion section 3-7 convert the specification of the audio information and the picture information to post it to the conversion section 3-5, the conversion section 3-5 posts the audio/picture information after converting the specification to a multiplex section 3-8, the multiplex section 3-8 multiplies the audio/picture information after converting the specification as the regenerated moving picture information to post it to the transmission/reception section 3-1, and the transmission/reception section 3-1 transmits the regenerated moving picture information to the moving picture terminal 8 via the exchange device 9.

Such a manner enables conversion of the specification of the audio/picture information without injuring the synchronism of the audio/picture information as the moving picture information

BRIEF DESCRIPTION OF THE DRAWINGS

This and other objects, features and advantages of the present invention will become more apparent upon a reading of the following detailed description and drawings, in which:

FIG. 1 is a block diagram illustrating one embodiment in accordance with the present invention;

FIG. 2 is a flowchart for explaining an operation of one embodiment in accordance with the present invention;

DESCRIPTION OF THE EMBODIMENTS

Figure 3:
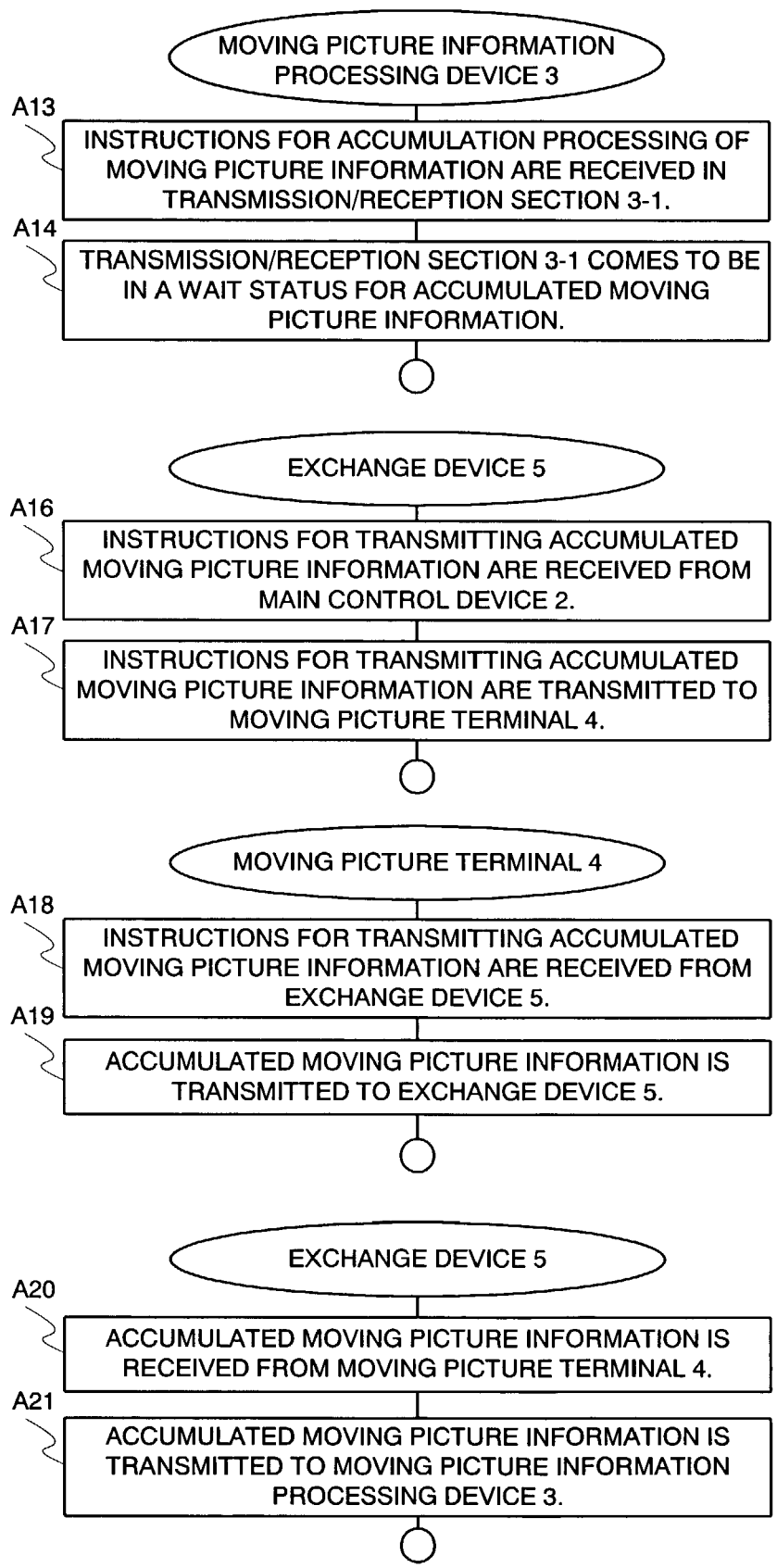
FIG. 3 is a flowchart for explaining an operation of one embodiment in accordance with the present invention.

Next, the present invention will be explained in details with regard to one preferred embodiment by referring to the accompanied drawings.

FIG. 1 is a block diagram illustrating one embodiment in accordance with the present invention.

(1) In FIG. 1, when synchronous data length information is loaded from a maintenance device 1, the synchronous data length information is transmitted to a main control device 2, and the main control device 2 transmits the received synchronous data length information to a moving picture information processing device 3 via a network 10.

(2) The moving picture information processing device 3 receives the synchronous data length information in a transmission/reception section 3-1, and establishes it in a non-volatile memory 3-2.

(3) In FIG. 1, when an picture-recording operation is executed from a moving picture terminal 4, instructions for picture recording are transmitted to the main control device 2 via an exchange device 5, and the main control device 2 transmits instructions for accumulation processing of moving picture information to the moving picture information processing device 3.

(4) The moving picture information processing device 3, which receives the instructions for accumulation processing of moving picture information in the transmission/reception section 3-1, comes to be in a wait status for accumulated moving picture information.

(5) After said (3) operation, the main control device 2 transmits to the moving picture terminal 4 instructions for transmitting accumulated moving picture information via the exchange device 5, and the moving picture terminal 4 transmits the accumulated moving picture information to the moving picture information processing device 3 via the exchange device 5.

(6) The moving picture information processing device 3 receives the accumulated moving picture information in the transmission/reception section 3-1 and posts it to a separation section 3-3.

(7) The separation section 3-3 separates the accumulated moving picture information, which was received, into audio information and picture information, and posts it to a synchronizing control section 3-4.

(8) The synchronizing control section 3-4 sequentially receives the separated audio information and picture information, delimits the data as a block at the point that the received data length of either of the audio information and the picture information reached the synchronous data length established in the non-volatile memory 3-2, gives the data length within the block of the audio information and the picture information to the head end of the data block as the synchronous information, and posts it to the transmission/reception section 3-1.

(9) The transmission/reception section 3-1 transmits the audio/picture information, to which the synchronous information was affixed, to an accumulation control device 6.

(10) The accumulation control device 6 receives the audio/picture information to which the synchronous information was affixed, and accumulates it in an accumulation device 7.

(11) In FIG. 1, when a regenerative operation is executed from a moving picture terminal 8, instructions for regeneration are transmitted to the main control device 2 via an exchange device 9, and the main control device 2 transmits instructions for regeneration processing of moving picture information to the moving picture information processing device 3.

(12) Within the moving picture information processing device 3, the instructions for regeneration processing of moving picture information are received in the transmission/reception section 3-1, which comes to be in a wait status for regenerated moving picture information.

(13) After said (11) operation, the main control device 2 transmits to the accumulation control device 6 instructions for transmitting regenerated moving picture information, and the accumulation control device 6 obtains the audio/picture information to which the synchronous information was affixed from the accumulation device 7, and transmits it to the moving picture information processing device 3.

(14) The moving picture information processing device 3 receives the audio/picture information to which the synchronous information was affixed in the transmission/reception section 3-1, and posts it to a conversion section 3-5.

(15) The conversion section 3-5 sequentially receives the audio/picture information to which the synchronous information was affixed, determines a delimiter of the data block from the affixed synchronous information, and posts the audio information to a audio conversion section 3-6 of and the picture information to an picture conversion section 3-7 respectively data block by data block.

(16) The audio conversion section 3-6 converts the specification of the audio information and posts it to a conversion section 3-5.

(17) The picture conversion section 3-7 converts the specification of the picture information and posts it to a conversion section 3-5.

(18) The conversion section 3-5 posts the audio/picture information after converting the specification to a multiplex section 3-8.

(19) The multiplex section 3-8 multiplexes the audio/picture information after converting the specification as regenerated moving picture information, and posts it to the transmission/reception section 3-1.

(20) The transmission/reception section 3-1 transmits the regenerated moving picture information to the moving picture terminal 8 via the exchange device 9.

Next, each configuration element section of one embodiment in accordance with the present invention will be explained.

The maintenance device 1 is a device having an input function for loading the synchronous data length information to be established into the non-volatile memory 3-2 of the moving picture information processing device 3, and a function of transmitting the input information to the main control device 2.

The main control device 2 is a device having: a function of receiving the synchronous data length information from the maintenance device 1 and a function of transmitting the synchronous data length information to the moving picture information processing device 3; a function of receiving the instructions for picture recording from the exchange device 5 and a function of transmitting to the moving picture information processing device 3 the instructions for accumulation processing of moving picture information and to the exchange device 5 the instructions for transmitting accumulated moving picture information respectively at the time of receiving the instructions for picture recording; and a function of receiving the instructions for regeneration from the exchange device 9 and a function of transmitting to the moving picture information processing device 3 the instructions for regeneration processing of moving picture information and to the accumulation control device 6 the instructions for transmitting regenerated moving picture information respectively at the time of receiving the instructions for regeneration.

The moving picture information processing device 3 is a device having: a function of, at the time of loading the synchronous data length information from the maintenance device 1, storing the synchronous data length information in the non-volatile memory 3-2; a function of, at the time of the picture-recording operation from the moving picture terminal 4, coming to be in a wait status for the accumulated moving picture information to convert the accumulated moving picture information received from the moving picture terminal 4 into the audio/picture information, to which the synchronous information was affixed, based on the synchronous data length information, and to transmit it to the accumulation device 7; and a function of, at the time of the regenerative operation from the moving picture terminal 8, coming to be in a wait status for the regenerated moving picture information to convert the audio/picture information received from the accumulation device 7, to which the synchronous information was affixed, into the regenerated moving picture information based on the affixed synchronous information, and to transmit it to the moving picture terminal 8.

Within the moving picture information processing device 3, the transmission/reception section 3-1 has: a function of receiving the synchronous data length information from the main control device 2 and a function of establishing the synchronous data length information in the non-volatile memory 3-2; a function of receiving the instructions for accumulation processing of moving picture information from the main control device 2 and a function of coming to be in a wait status for the accumulated moving picture information by receiving the instructions; a function of receiving the accumulated moving picture information from the exchange device 5 and a function of posting the accumulated moving picture information to the separation section 3-3; a function of receiving the audio/picture information, to which the synchronous information was affixed, from the synchronizing control section 3-4 and a function of transmitting the audio/picture information, to which the synchronous information was affixed, to the accumulation control device 6; a function of receiving the instructions for regeneration processing of moving picture information from the main control device 2 and a function of coming to be in a wait status for the regenerated moving picture information by receiving the instructions; a function of receiving the audio/picture information, to which the synchronous information was affixed, from the accumulation control device 6 and a function of posting the audio/picture information to which the synchronous information was affixed to the conversion section 3-5; and a function of receiving the regenerated moving picture information from the multiplex section 3-8 and a function of transmitting the regenerated moving picture information to the exchange device 9.

Within the moving picture information processing device 3, the non-volatile memory 3-2 is a memory in which the synchronous data length information is stored.

Within the moving picture information processing device 3, the separation section 3-3 has a function of receiving the accumulated moving picture information from the transmission/reception section 3-1, a function of separating the accumulated moving picture information into the audio information and the picture information, and a function of posting the separated audio information and picture information to the synchronizing control section 3-4.

Within the moving picture information processing device 3, the synchronizing control section 3-4 has a function of sequentially receiving the audio information and the picture information separated by the separation section 3-3, a function of detecting that the received data length of either of the audio information and the picture information reached the synchronous data length established in the non-volatile memory 3-2, a function of delimiting the audio information and the picture information as a block, a function of affixing the data length within the block of the audio information and the picture information to the head end of the data block as the synchronous information, a function of detecting that the reception of the audio information and the picture information finished, and a function of posting the audio/picture information to which the synchronous information was affixed to the transmission/reception section 3-1.

Within the moving picture information processing device 3, the conversion section 3-5 has a function of sequentially receiving the audio/picture information, to which the synchronous information was affixed, from the transmission/reception section 3-1, a function of detecting the delimiter of the data block from the affixed synchronous information, a function of posting the audio information to the audio conversion section 3-6, a function of posting the picture information to the picture conversion section 3-7, a function of receiving the audio information after converting the specification from the audio conversion section 3-6, a function of receiving the picture information after converting the specification from the picture conversion section 3-7, a function of posting the audio information and the picture information after converting the specification to the multiplex section 3-8, and a function of detecting that the reception of the audio/picture information, to which the synchronous information was affixed, finished.

Within the moving picture information processing device 3, the audio conversion section 3-6 has a function of receiving the audio information from the conversion section 3-5, a function of converting the specification of the audio information, and a function of posting the audio information after converting the specification to the conversion section 3-5.

Within the moving picture information processing device 3, the picture conversion section 3-7 has a function of receiving the picture information from the conversion section 3-5, a function of converting the specification of the picture information, and a function of posting the picture information after converting the specification to the conversion section 3-5.

Within the moving picture information processing device 3, the multiplex section 3-8 has a function of receiving the audio/picture information after converting the specification from the conversion section 3-5, a function of multiplexing the audio/picture information after converting the specification as the regenerated moving picture information, and a function of posting the regenerated moving picture information to the transmission/reception section 3-1.

The moving picture terminal 4 is a device having: an input function for executing the picture-recording operation and a function of transmitting the instructions for picture recording to the exchange device 5; and a function of receiving the instructions for transmitting the accumulated moving picture information from the exchange device 5 and a function of transmitting the accumulated moving picture information to the exchange device 5.

The exchange device 5 is a device having: a function of receiving the instructions for picture recording from the moving picture terminal 4 and a function of transmitting the instructions for picture recording to the main control device 2; a function of receiving the instructions for transmitting accumulated moving picture information from the main control device 2 and a function of transmitting to the moving picture terminal 4 instructions for transmitting accumulated moving picture information; and a function of receiving the accumulated moving picture information from the moving picture terminal 4 and a function of transmitting the accumulated moving picture information to the moving picture information processing device 3.

The accumulation control device 6 is a device having: a function of receiving the audio/picture information, to which the synchronous information was affixed, from the moving picture information processing device 3 and a function of accumulating the audio/picture information, to which the synchronous information was affixed, in the accumulation device 7; and a function of receiving the instructions for transmitting regenerated moving picture information from the main control device 2 and a function of obtaining the audio/picture information, to which the synchronous information was affixed, from the accumulation device 7 and a function of transmitting the audio/picture information, to which the synchronous information was affixed, to the moving picture information processing device 3.

The accumulation device 7 is a device having a function of accumulating the audio/picture information to which the synchronous information was affixed.

The moving picture terminal 8 is a device having: an input function for executing the regenerative operation and a function of transmitting the instructions for regeneration to the exchange device 9; and a function of receiving the regenerated moving picture information from the exchange device 9.

The exchange device 9 is a device having: a function of receiving the instructions for regeneration from the moving picture terminal 8 and a function of transmitting the instructions for regeneration to the main control device 2; and a function of receiving the regenerated moving picture information from the moving picture information processing device 3 and a function of transmitting the regenerated moving picture information to the moving picture terminal 8.

Figure 4:
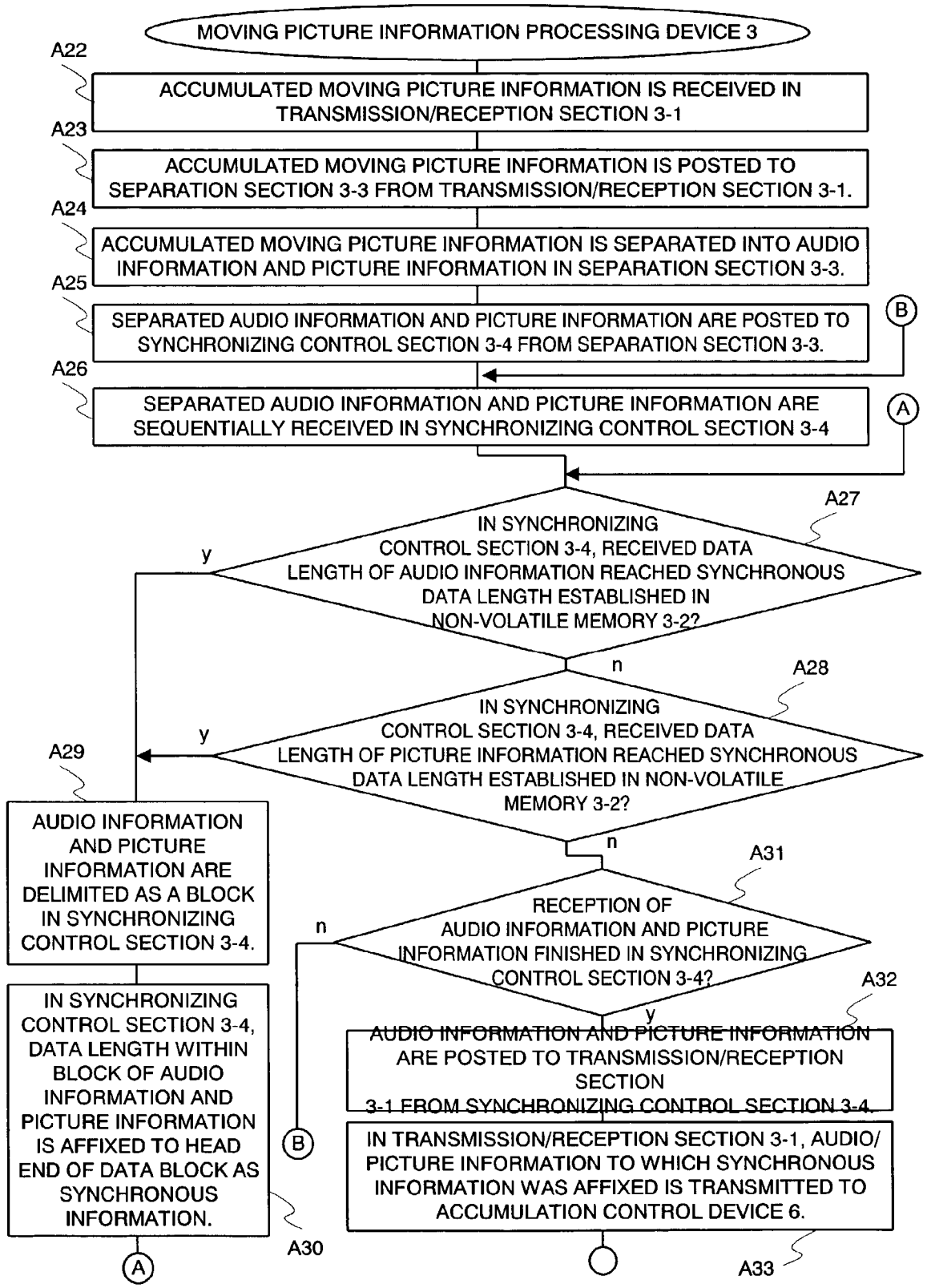
FIG. 4 is a flowchart for explaining an operation of one embodiment in accordance with the present invention.
Figure 5:
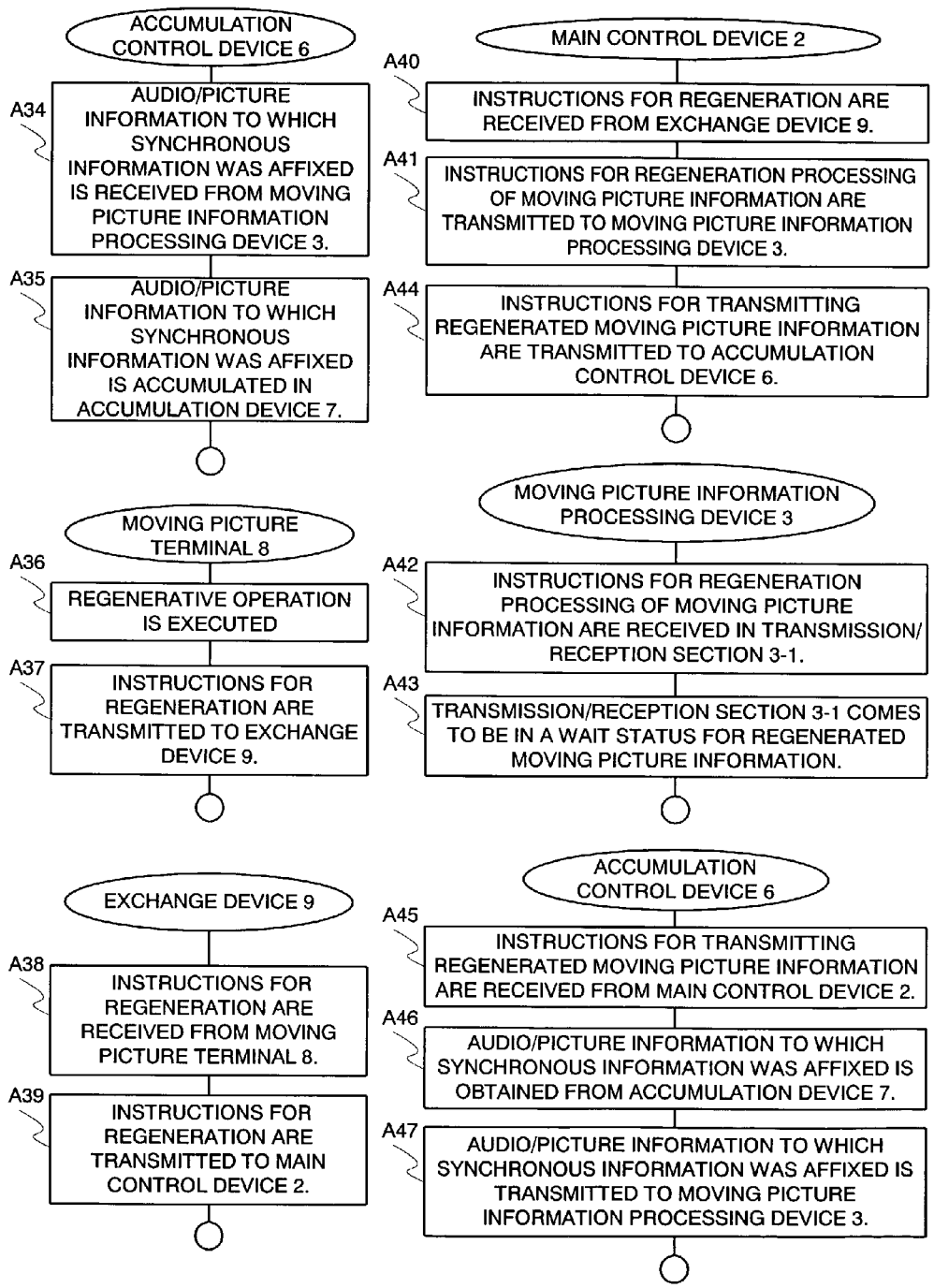
FIG. 5 is a flowchart for explaining an operation of one embodiment in accordance with the present invention and FIG. 6 is a flowchart for explaining an operation of one embodiment in accordance with the present invention.
Figure 6:
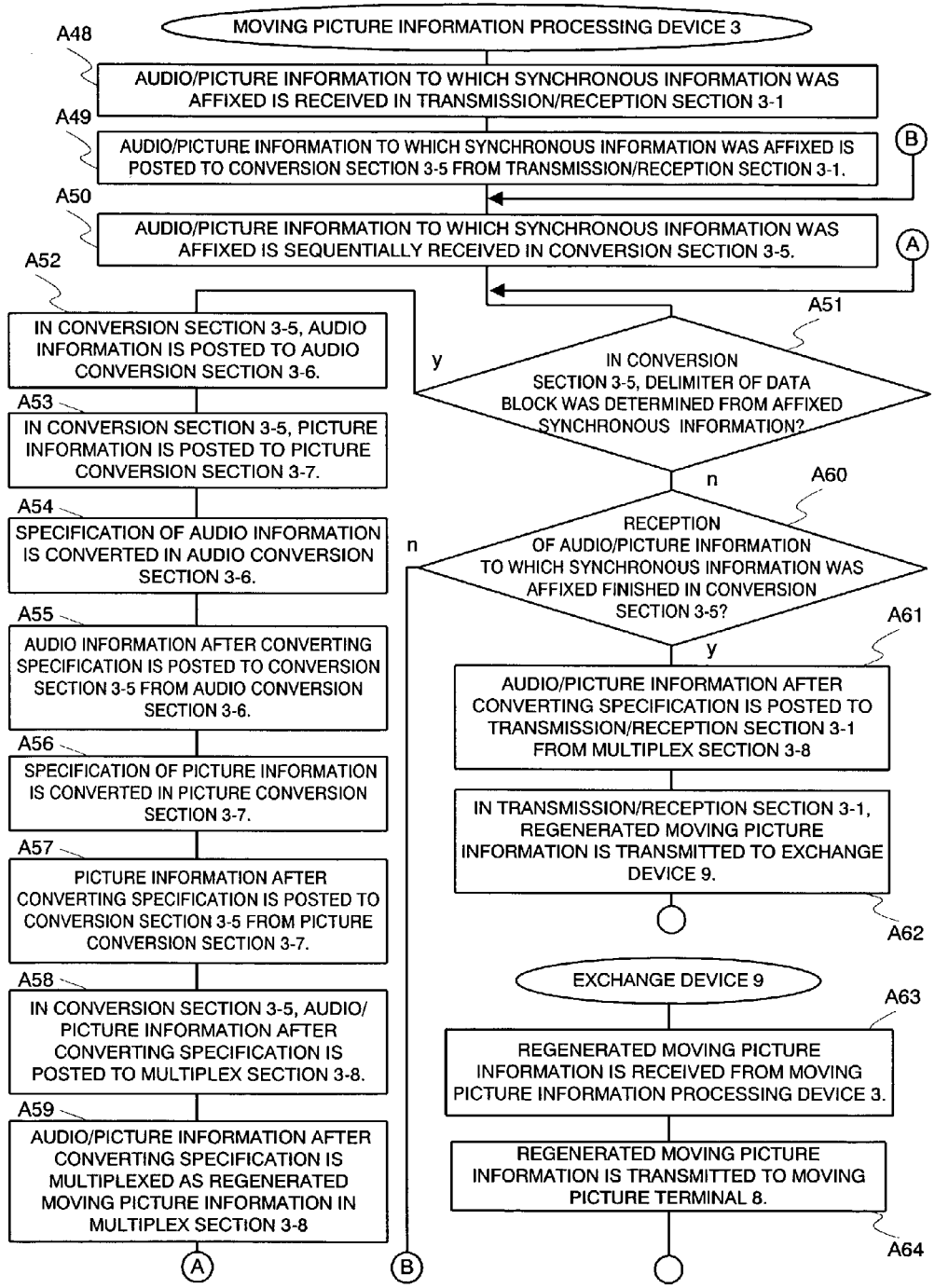

Next, a whole operation of one embodiment in accordance with the present invention will be explained in details by referring to FIG. 1 and flowcharts of FIG. 2 to FIG. 6.

In FIG. 1, when the synchronous data length information is loaded from the maintenance device 1 (step A1 of FIG. 2), the synchronous data length information is transmitted to the main control device 2 (step A2), and the main control device 2 transmits the received synchronous data length information to the moving picture information processing device 3 (steps A3 and A4).

The moving picture information processing device 3 receives the synchronous data length information in the transmission/reception section 3-1 (step A5), and establishes it in the non-volatile memory 3-2 (step A6).

In FIG. 1, when the picture-recording operation is executed from the moving picture terminal 4 (step A7), the instructions for picture recording is transmitted to the main control device 2 via the exchange device 5 (steps A8, A9 and A10), and the main control device 2 transmits the instructions for accumulation processing of moving picture information to the moving picture information processing device 3 (steps A11 and A12).

The moving picture information processing device 3 receives the instructions for accumulation processing of moving picture information in the transmission/reception section 3-1 (step A13), which comes to be in a wait status for the accumulated moving picture information (step A14).

After the operation of said steps A7 to A12, the main control device 2 transmits the instructions for transmitting accumulated moving picture information to the moving picture terminal 4 via the exchange device 5 (steps A15, A16 and A17 of FIG. 2 and FIG. 3), and the moving picture terminal 4 transmits the accumulated moving picture information to the moving picture information processing device 3 via the exchange device 5 (steps A18, A19, A20 and A21).

The moving picture information processing device 3 receives the accumulated moving picture information in the transmission/reception section 3-1 (step A22 of FIG. 4), and posts it to the separation section 3-3 (step A23).

The separation section 3-3 separates the accumulated moving picture information, which was received, into the audio information and the picture information (step A24), and posts it to the synchronizing control section 3-4 (step A25).

The synchronizing control section 3-4 sequentially receives the separated audio information and picture information (step A26), delimits the data as a block at the point that the received data length of either of the audio information and the picture information reached the synchronous data length established in the non-volatile memory 3-2 (steps A27, A28 and A29), affixes the data length within the block of the audio information and the picture information to the head end of the data block as the synchronous information (step A30), and posts it to the transmission/reception section 3-1 (steps A31 and A32).

The transmission/reception section 3-1 transmits the audio/picture information, to which the synchronous information was affixed, to the accumulation control device 6 (step A33).

The accumulation control device 6 receives the audio/picture information to which the synchronous information was affixed (step A34 of FIG. 5), and accumulates it in the accumulation device 7 (step A35).

In FIG. 1, when the regenerative operation is executed from the moving picture terminal 8 (step A36), the instructions for regeneration are transmitted to the main control device 2 via the exchange device 9 (steps A37, A38 and A39), and the main control device 2 transmits the instructions for regeneration processing of moving picture information to the moving picture information processing device 3 (steps A40 and A41).

The moving picture information processing device 3 receives the instructions for regeneration processing of moving picture information in the transmission/reception section 3-1 (step A42), which comes to be in a wait status for the regenerated moving picture information (step A43).

After the operation of said steps A36 to A39, the main control device 2 transmits to the accumulation control device 6 the instructions for transmitting regenerated moving picture information (step A44), and the accumulation control device 6 obtains the audio/picture information, to which the synchronous information was affixed, from the accumulation device 7 (steps A45 and A46), and transmits it to the moving picture information processing device 3 (step A47).

The moving picture information processing device 3 receives the audio/picture information, to which the synchronous information was affixed, in the transmission/reception section 3-1 (step A48 of FIG. 6), and posts it to the conversion section 3-5 (step A49).

The conversion section 3-5 sequentially receives the audio/picture information to which the synchronous information was affixed (step A50), determines the delimiter of the data block from the affixed synchronous information (step A51), and posts the audio information to the audio conversion section 3-6 (step A52) and the picture information to the picture conversion section 3-7 respectively data block by data block (step A53).

The audio conversion section 3-6 converts the specification of the audio information (step A54) and posts it to the conversion section 3-5 (step A55).

The picture conversion section 3-7 converts the specification of the picture information (step A56) and posts it to the conversion section 3-5 (step A57).

The conversion section 3-5 posts the audio/picture information after converting the specification to the multiplex section 3-8 (step A58).

The multiplex section 3-8 multiplexes the audio/picture information after converting the specification as the regenerated moving picture information (step A59) and posts it to the transmission/reception section 3-1 (steps A60 and A61).

The transmission/reception section 3-1 transmits the regenerated moving picture information to the moving picture terminal 8 via the exchange device 9 (steps A62, A63 and A64).

The present invention is to be configured and operated as mentioned above, and the effects as shown in the following are obtained in accordance with the present invention.

A first effect lies in the fact that, in the event that the moving picture terminal for picture recording and the moving picture terminal for regeneration differ in specification of audio/picture information, the specification of the audio/picture information can be converted without injuring the synchronism of the audio and picture information as the moving picture information to multiplex the audio and picture information after converting the specification as the regenerated moving picture information.

The reason thereof is that the synchronous information is affixed based on the synchronous data length information at the time of accumulating.

A second effect lies in the fact that synchronous quality of the regenerated moving picture information and efficiency of accumulation in the accumulation device can be regulated by altering establishment of the synchronous data length information.

The reason thereof is that loading of the synchronous data length information from the maintenance device allows the establishment of the synchronous data length information to be altered.

What is claimed is:

1. A system for producing, storing and reproducing audiovisual information, the system comprising:
   a first terminal;
   a second terminal;
   a control device;
   an information processing device; and
   a memory device;
   wherein the control device sends a synchronous data length to the information processing device;
   wherein the information processing device receives the synchronous data length from the control device;
   wherein the first terminal produces the audiovisual information, the audiovisual information comprising audio information and visual information;
   wherein the information processing device comprises:
      a transmission/reception device that receives the audiovisual information from the first terminal;
      a separation device that receives the audiovisual information from the transmission/reception device and separates the audio information from the visual information; and
      a synchronizing control section that: 1) receives from the separation device the audio information and the visual information; 2) delimits and defines data blocks, each of the data blocks comprising a subset of the audio information and a subset of the visual information, upon one of A) a data length of the corresponding subset of the audio information reaching the synchronous data length and B) a data length of the corresponding subset of the visual information reaching the synchronous data length; and 3) affixes to each of the data blocks a data length of the corresponding data block to produce length-affixed data blocks; and
   wherein the transmission/reception device sends the length-affixed data blocks to the memory device;
   wherein the memory device receives the length-affixed data blocks from the transmission/reception device and stores the length-affixed data blocks;
   wherein, upon receipt of a request from the second terminal to reproduce the audiovisual information at the second terminal per a required specification, the control device instructs the memory device to send the length-affixed data blocks to the transmission/reception device;
   wherein the transmission/reception device receives the length-affixed data blocks from the memory device;
   wherein the information processing device further comprises:
      a conversion section that, for each of the length-affixed data blocks received from the transmission/reception device, uses the corresponding affixed data length to determine the corresponding delimiter defined by the synchronizing control section and recognizes each length-affixed data block as distinct from other length-affixed data blocks;
      an audio conversion device that, for each of the length-affixed data blocks, converts to the required specification the corresponding subset of audio information;
      a visual conversion device that, for each of the length-affixed data blocks, converts to the required specification the corresponding subset of visual information; and
      a multiplexer that, for each of the length-affixed data blocks, multiplexes the converted subset of audio information and the converted subset of visual information and produces a multiplexed subset of audiovisual information; and
   wherein the transmission/reception device sends the multiplexed subset of audiovisual information corresponding to each of the data blocks to the second terminal for reproduction.

2. The system according to claim 1, wherein the information processing device further comprises a non-volatile memory for storing the synchronous data length.

3. The system according to claim 1, further comprising a maintenance device for loading the synchronous data length and sending the synchronous data length to the control device.

4. A method for producing and storing audiovisual information and reproducing the audiovisual information per a required specification, the method comprising:
   loading a synchronous data length;
   producing the audiovisual information, the audiovisual information comprising audio information and visual information;
   separating the audio information from the visual information;
   delimiting and defining data blocks, each of the data blocks comprising a subset of the audio information and a subset of the visual information, upon one of A)

a data length of the corresponding subset of the audio information reaching the synchronous data length and B) a data length of the corresponding subset of the visual information reaching the synchronous data length;

affixing to each of the data blocks a data length of the corresponding data block to produce length-affixed data blocks;

storing the length-affixed data blocks;

retrieving the stored length-affixed data blocks;

for each of the retrieved length-affixed data blocks:

using the corresponding affixed data length to determine the corresponding delimiter and recognizing each retrieved length-affixed data block as distinct from other retrieved length-affixed data blocks;

converting to the required specification the corresponding subset of audio information;

converting to the required specification the corresponding subset of visual information; and multiplexing the converted subset of audio information and the converted subset of visual information and producing a multiplexed subset of audiovisual information; and reproducing the audiovisual information by displaying the multiplexed subset of audiovisual information corresponding to each of the data blocks.

5. The method according to claim 4, further comprising storing the synchronous data length in a non-volatile memory.

* * * * *